United States Patent
Meriö

(10) Patent No.: US 11,422,585 B2
(45) Date of Patent: Aug. 23, 2022

(54) CLOCK CALIBRATION

(71) Applicant: Nordic Semiconductor ASA, Trondheim (NO)

(72) Inventor: Ville Meriö, Trondheim (NO)

(73) Assignee: Nordic Semiconductor ASA, Trondheim (NO)

(*) Notice: Subject to any disclaimer, the term of this patent is extended or adjusted under 35 U.S.C. 154(b) by 102 days.

(21) Appl. No.: 16/961,209

(22) PCT Filed: Jan. 14, 2019

(86) PCT No.: PCT/EP2019/050778
§ 371 (c)(1),
(2) Date: Jul. 9, 2020

(87) PCT Pub. No.: WO2019/138102
PCT Pub. Date: Jul. 18, 2019

(65) Prior Publication Data
US 2020/0348715 A1    Nov. 5, 2020

(30) Foreign Application Priority Data
Jan. 12, 2018    (GB) ...................................... 1800552

(51) Int. Cl.
*G06F 1/04* (2006.01)
*G06F 1/32* (2019.01)
(Continued)

(52) U.S. Cl.
CPC .............. *G06F 1/04* (2013.01); *G06F 1/3237* (2013.01); *H04W 52/0293* (2013.01)

(58) Field of Classification Search
CPC . G06F 1/3237; G06F 1/04; G06F 1/12; G06F 1/14
See application file for complete search history.

(56) References Cited

U.S. PATENT DOCUMENTS 6,725,067 B1    4/2004  Marx et al.
7,272,078 B1 *  9/2007  Haartsen .................. H03L 7/00
                                                    368/118
(Continued)

FOREIGN PATENT DOCUMENTS

EP    0 865 167 A2    9/1998
EP    2 089 970 A1    8/2009
(Continued)

OTHER PUBLICATIONS

International Search Report and Written Opinion for PCT/EP2019/050778, dated Mar. 28, 2019, 16 pages.
(Continued)

*Primary Examiner* — Jaweed A Abbaszadeh
*Assistant Examiner* — Cheri L Harrington
(74) *Attorney, Agent, or Firm* — Klarquist Sparkman, LLP (57) ABSTRACT

A circuit system comprises a processor, a first clock with a first frequency, a second clock with a second frequency, such second frequency being higher than said first frequency and a clock calibration module. The clock calibration module comprises a plurality of counters configured to count cycles of the second clock when triggered. Each of the plurality of counters is configured to be triggered at successive cycles of the first clock. Each of the plurality of counters is configured, after a predetermined number of cycles of the first clock, to output a count of elapsed second clock cycles and the processor is configured to determine, using the counts outputted by the plurality of counters, a ratio between the first frequency and the second frequency.

17 Claims, 4 Drawing Sheets

(51) Int. Cl.
*H04W 52/02* (2009.01)
*G06F 1/3237* (2019.01)

(56) References Cited

U.S. PATENT DOCUMENTS

| | | | |
|---|---|---|---|
| 10,218,363 B1* | 2/2019 | Kavousian | G06F 1/32 |
| 10,390,305 B1* | 8/2019 | Geekie | H04W 56/0035 |
| 2003/0043766 A1 | 3/2003 | McDonough et al. | |
| 2007/0105525 A1 | 5/2007 | Wang et al. | |
| 2009/0296531 A1* | 12/2009 | Haartsen | H03L 1/00 |
| | | | 368/47 |
| 2012/0294212 A1* | 11/2012 | Merio | H04W 52/0293 |
| | | | 370/311 |
| 2014/0082396 A1 | 3/2014 | Vahidsafa et al. | |
| 2015/0074444 A1* | 3/2015 | Meyer | G06F 1/08 |
| | | | 713/501 |
| 2019/0033354 A1* | 1/2019 | Shamir | G06F 1/14 |

FOREIGN PATENT DOCUMENTS

| | | |
|---|---|---|
| GB | 2 329 795 A | 3/1999 |
| GB | 2 491 001 A | 11/2012 |
| WO | WO 97/39529 | 10/1997 |

OTHER PUBLICATIONS

IPO Search Report under Section 17(5) for GB1800552.0, dated Jul. 2, 2018, 5 pages.

* cited by examiner

CLOCK CALIBRATION

CROSS REFERENCE TO RELATED APPLICATIONS

This is the U.S. National Stage of International Application No. PCT/EP2019/050778, filed Jan. 14, 2019, which was published in English under PCT Article 21(2), which in turn claims the benefit of Great Britain Application No. 1800552.0, filed Jan. 12, 2018.

TECHNICAL FIELD

This invention relates to integrated circuit systems. It relates particularly, although not exclusively, to clocks within integrated circuit systems.

BACKGROUND

Integrated circuit systems, e.g. System on Chips (SoCs), often comprise precise timing components in order to ensure accurate synchronisation both internally and with external devices, e.g. a modem communicating with a network. In order to ensure correct synchronisation, a high precision clock is typically provided as part of the SoC, e.g. a crystal oscillator or a high frequency RC oscillator.

While such high precision clocks provide a reliable means for keeping relatively accurate time, they typically have large power demands, and in applications where energy efficiency is of high importance, such as in battery powered devices where long battery life is important, it is undesirable to have to operate such high precision clocks all the time.

To reduce power consumption therefore, a SoC may utilise a lower frequency clock with correspondingly lower power demand. However, these can be more susceptible to timing errors such as random jitter (where the rising edges of the clock do not fall precisely regularly) and/or drift (where the frequency of the clock differs from its nominal value, e.g. due to temperature changes), and cannot therefore be relied upon for applications requiring highly precise timing, e.g. the synchronisation of discontinuous reception periods.

The present invention seeks to address the issue outlined above.

SUMMARY

From a first aspect the invention provides a circuit system comprising:
- a processor;
- a first clock with a first frequency;
- a second clock with a second frequency, such second frequency being higher than said first frequency; and
- a clock calibration module comprising a plurality of counters configured to count cycles of the second clock when triggered; wherein
- each of the plurality of counters is configured to be triggered at successive cycles of the first clock;
- each of the plurality of counters is configured, after a predetermined number of cycles of the first clock, to output a count of elapsed second clock cycles; and
- the processor is configured to determine, using the counts outputted by the plurality of counters, a ratio between the first frequency and the second frequency.

Thus it will be seen by those skilled in the art that, in accordance with the invention, the frequencies of two clocks may be compared quickly and accurately. The Applicant has appreciated that staggering the triggering of multiple counters to count in parallel reduces the effect of jitter present in the first frequency on any one measurement while not significantly increasing the time required to determine a ratio.

The counters may be configured to count the number of cycles of the second clock taken for just one cycle of the first clock to elapse—i.e. the predetermined number of cycles of the first clock may be one. While this is the fastest option for calculating the ratio between the two frequencies it may be too susceptible to a phase difference between the first and second clocks along with other sources of error, especially when only a few counters are used. More preferably therefore the counters are configured to count the number of cycles of the second clock taken for M cycles of the first clock to elapse, where M is greater than one. Whilst this approach takes longer to produce a result than the single cycle approach previously described, measuring multiple cycles decreases the impact of a phase difference between the first and second clocks on the measurement as one phase-offset rising edge does not corrupt the entire measurement. Depending on a nominal ratio between the first and second frequencies and the accuracy required, M is typically chosen to be more than 50, and preferably more than 100, e.g. more than 150 or more than 200.

In a set of embodiments, the counters are hardware counters. Using hardware counters (rather than software based counters) frees the processor up to perform other operations whilst counting is performed, which can be for a significant duration. Hardware counters may also be able to provide a more accurate count.

The processor may be configured to determine an initial value for the ratio using the count outputted by a first counter of the plurality of counters. In some embodiments this initial value may be refined using counts from subsequent counters, e.g. by averaging. Averaging counts from multiple counters may further mitigate the effects of random jitter in the frequency of the first clock, as jitter on any one measurement has a reduced impact on the final determined ratio. Performing measurements in parallel using multiple counters may decrease the time taken to accurately determine the ratio between the first and second frequencies. The number of counters used depends upon the amount of jitter expected and the nominal ratio between the first and second frequencies. In some embodiments only two counters may be used to take measurements, although in a set of embodiments at least five counters are used, and in some embodiments up to 10 counters are used. With particularly poor quality clock signals an even higher number of counters may be required, e.g. 12, 15 or up to 20.

While there are many possible applications of the present invention, the Applicant has appreciated that the present invention is particularly suited to facilitating accurate timing within a circuit system using low frequency clock components, as will be explained below. As mentioned above, low frequency clocks may have reduced power requirements and they are often also less expensive to implement than high frequency components.

In some embodiments the processor is operable in a lower power state and a higher power state. The processor may be configured to execute tasks periodically, for which it must be in the higher power state, and to enter into the lower power state between task executions to save power. The second clock is preferably not powered when the processor is in the low power state.

Some tasks within circuit systems require execution at very precise times. For example discontinuous reception (DRX) operation can significantly reduce the power demands of a radio communications device by utilising periodic DRX cycles, wherein the device receives data only in a short burst at the start of each DRX cycle, such that the device is only active (and using power) for a fraction of each DRX cycle. However, to achieve correct operation, these cycles must be highly synchronised with other network elements and so precise timing is critical. In some embodiments this timing is achieved by the first clock being configured to issue a signal to the processor once a pre-set number of cycles have elapsed, which causes the processor to execute a task, such as starting a receiver to receive data.

As highlighted above however, lower frequency clocks are more susceptible to frequency drift than higher frequency clocks and therefore time measurements made using the first clock may not be entirely reliable. For instance, if the actual frequency of the first clock in use is lower than its nominal value (due to, for example, a change in ambient temperature), time measurements made using the first clock will be underestimations, leading to, in the embodiments described above, the possibility that a task is executed too late. If the first clock runs fast, the opposite is true, and the task would be executed too early. A timing error in either direction may be detrimental to the operation of the system, for example in the case of data reception, if the timing of the cycle is incorrect (i.e. too late or too early), the radio communications device may be unable to perform any decoding and may lose network synchronisation.

The Applicant has realised however that by accurately determining the ratio between the frequencies of the first and second clocks, drift in the frequency of the first clock can be measured and compensated for when making time measurements. In some embodiments therefore the processor is configured to use the determined ratio between the first frequency and the second frequency to calibrate the pre-set number of cycles used by the first clock. For example if the determined ratio indicates that the frequency of the first clock has drifted such that the first clock runs slow, the number of cycles may be reduced such that the next signal is issued at the correct time.

By doing so, the processor may accurately maintain timing using the first clock, with the (higher power, but more accurate) second clock only being used to calibrate periodically the first clock. The second clock may be powered off at times other than during calibrations to save power. In some embodiments, the processor is configured to perform a calibration of the first clock every time it enters the higher power state, although the processor may instead decide dynamically whether or not to perform a calibration based upon a previously determined ratio. For example, if it is determined at a calibration that negligible frequency drift had occurred, the processor may decide not to perform a calibration next time it enters into the higher power state. Dynamic calibration in this way can reduce power use by reducing the number of calibrations required and thus the length of time for which the second clock must be powered.

The clock calibration module may further comprise a ring buffer, to which the counts outputted by the plurality of counters are saved, e.g. as soon as they are outputted. Preferably, the processor is configured such that it may read the contents of the ring buffer at any point, for example when only one of the counters has outputted a count.

In some embodiments, the processor is configured to provide one or more measurement parameters to the clock calibration module. Measurement parameters may include the predetermined number of cycles of the first clock measured by each counter, the interval at which counters are triggered or the number of counters used for a particular calibration. The processor may be configured to vary dynamically the measurement parameters provided to the clock calibration module dependent upon a previously determined ratio (i.e. if the ratio indicates that negligible drift is present, the measurement parameters may be adjusted to shorten the duration of a calibration, e.g. by reducing the number of cycles of the first clock measured by each counter). Efficient control of the measurement parameters and/or calibration length in this way may reduce the power consumption of the circuit portion.

In addition, the processor may be configured to cut short a calibration if a value of the ratio calculated using measurements from only a sub-set of the plurality of counters definitively indicates that no or little drift has occurred since the last calibration. Additionally or alternatively, the processor may be configured to cut short a calibration if a value of the ratio calculated using measurements from only a sub-set of the plurality of counters is definitive, i.e. if an uncertainty parameter in the calculated value is below a threshold. The uncertainty parameter may comprise a measure of statistical dispersion (e.g. standard deviation, variance or spread) of the measurements from only a sub-set of the plurality of counters when deciding if the determined ratio is definitive. For example if measurements from only a sub-set of the plurality of counters have a standard deviation below a threshold value, the processor may cut the calibration short and use the average value of these measurements to calculate a ratio.

Reducing the time taken to calibrate the first clock may reduce power consumption, as in some circumstances the second clock may be powered down as soon as the calibration is complete. Conversely, the circuit system may be configured to extend a calibration, for example if a definitive value of the ratio cannot be established.

In addition to using a determined ratio to calibrate the first clock, the processor may also use the determined ratio to refine retroactively processor timing, such that it can determine a more accurate time e.g. relative to an external time such as a network time. The more accurate time may then be used to execute a task at precisely the right time.

As explained above, the processor may be configured to enter into the higher power state to execute a time-critical task at a predefined time. In order to ensure that the task is executed at the correct time e.g. relative to an external time such as a network time, the processor may be woken early enough to carry out a calibration of the first clock before the task falls due, so that the amount of drift in the first clock may be quantified, and the correct time to execute the task may be identified. The processor may therefore predict a maximum level of drift expected during a period of low power operation, so that it is woken early enough to have time to calibrate the first clock before the task falls due.

The maximum level of expected drift may be adjusted dynamically based upon a previously measured ratio, for example if the processor determines a ratio which indicates that the first frequency has drifted very little, the maximum level of expected drift may be reduced, and the pre-set number of cycles adjusted correspondingly. This ensures that the processor enters into the higher power state for only the minimum required length of time, avoiding unnecessary power use.

The first and second clocks may be any type of clock known in the art per se, although preferably the first clock comprises an RC oscillator. The second clock preferably comprises a crystal oscillator. The first frequency is preferably less than 100 kHz, e.g. 32.768 kHz. The second frequency is preferably greater than 1 MHz and may be several hundred MHz, for example 76.8 MHz or 160 MHz.

The circuit portion may be implemented in an integrated circuit system, for example a System on a Chip (SoC). Preferably the circuit portion is battery powered.

The Applicant considers the clock calibration module to be independently inventive and as such when viewed from a further aspect, the invention provides a circuit portion comprising:
 a first clock with a first frequency;
 a second clock with a second frequency, wherein the first frequency is lower than the second frequency; and
 a plurality of counters configured when triggered to count cycles of the second clock; wherein
 each of the plurality of counters is configured to be triggered at successive cycles of the first clock; and
 each of the plurality of counters is configured to output a count of elapsed second clock cycles after a predetermined number of cycles of the first clock.

Features of any aspect or embodiment described herein may, wherever appropriate, be applied to any other aspect or embodiment described herein. Where reference is made to different embodiments or sets of embodiments, it should be understood that these are not necessarily distinct but may overlap.

DETAILED DESCRIPTION

Certain preferred embodiments of the invention will now be described, by way of example only, with reference to the accompanying drawings, in which.

Figure 1:
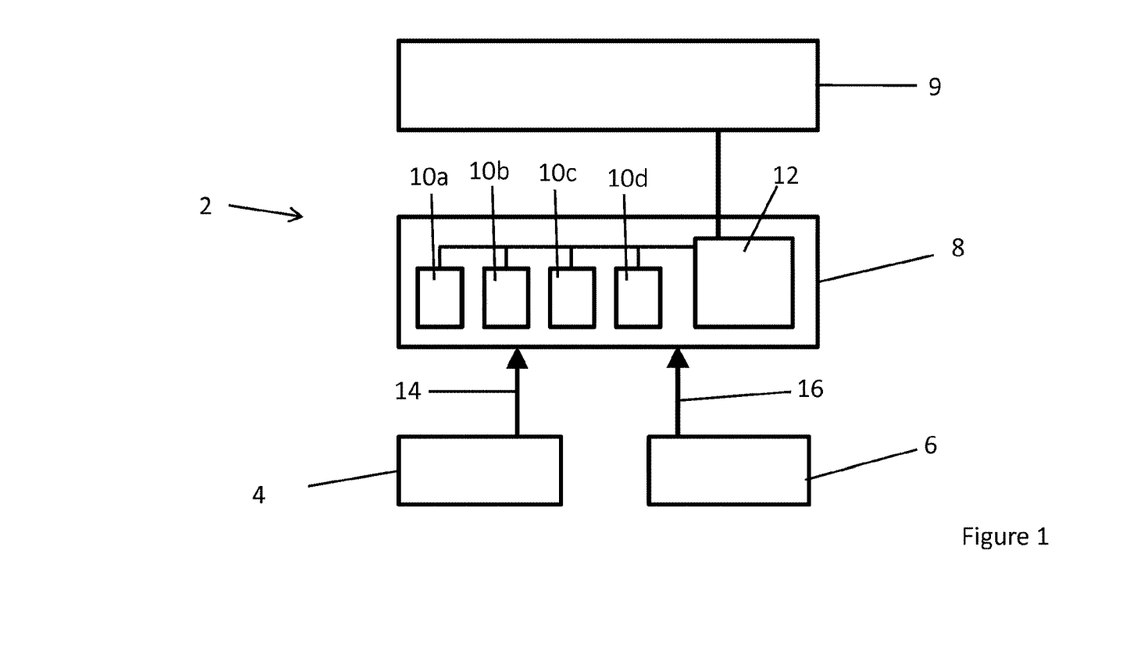
FIG. 1 shows a clock module according to an embodiment of the present invention.

FIG. 1 shows a clock module 2 according to an embodiment of the present invention which comprises a low frequency clock 4 (e.g. comprising an RC oscillator) which outputs a LF clock signal 14, a high frequency clock 6 (e.g. comprising an crystal oscillator) which outputs a HF clock signal 16, a clock calibration module 8 and a processor 9. The clock calibration module 8 comprises a plurality of counters 10a-d and a ring buffer 12. Whilst there are four counters 10a-d shown in FIG. 1, any number of counters may be provided.

The low frequency clock 4 nominally operates at a lower frequency $f_1$, and the high frequency clock 6 operates at a higher frequency $f_2$. The counters 10 are configured to, when triggered, count cycles of the high frequency clock 4. The clock calibration module 8 is configured to trigger successive counters 10 at successive cycles of the low frequency clock 4. The clock calibration module 8 is further configured to stop each of the counters 10 after each one has measured a predetermined number M of cycles of the low frequency clock 4, set by the processor 9. The processor 9 is configured to read the contents of the ring buffer 12 and calculate a ratio between the lower frequency $f_1$ and the higher frequency $f_2$.

Figure 2:
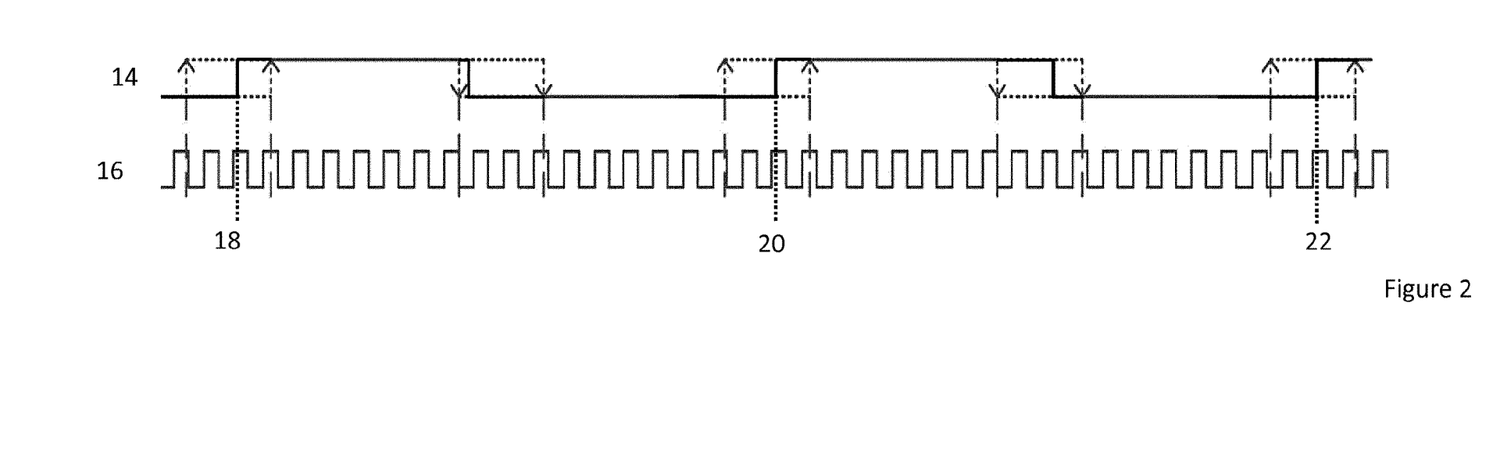
FIG. 2 is a timing diagram illustrating operation of the clock module in FIG. 1.

The operation of the clock module 2 will be described with reference to the timing diagram shown in FIG. 2. The low frequency clock 4 outputs a LF clock signal 14, and the high frequency clock 6 outputs a HF clock signal 16. The HF clock signal 16 and the LF clock signal 14 are shown in FIG. 2 as square wave signals, and the LF clock signal 14, due to limitations of the low frequency clock 4, demonstrates a significant amount of uncertainty in the timing of each rising and falling edge, illustrated here with the use of dashed lines. This uncertainty is referred to as jitter. Contrastingly, the HF clock signal 16 exhibits negligible jitter.

In general the LF clock signal 14 will be phase offset from the HF clock signal 16, whereby rising edges of each signal do not coincide. This phase offset can be a source of error when calculating the ratio between the lower frequency f1 and the higher frequency f2, especially when measurements are short (e.g. if their length is only a few cycles of the low frequency clock 4).

At a first time 18, a first rising edge of the LF clock signal 14 occurs and the clock calibration module 8 triggers the first counter 10a to begin counting cycles of the HF clock signal 16. At a second time 20, a second rising edge of the low frequency clock occurs. The clock calibration module 8 triggers the second counter 10b to begin counting cycles of the HF clock signal 16. At this point the first counter 10a has counted 18 HF cycles.

At a third time 22, a third rising edge of the LF clock signal 14 occurs. At this point the first counter 10a has counted 35 cycles and the second counter has counted 17 cycles. The clock calibration module 8 stops the first counter 10a and triggers the third counter 10c. The count from the first counter 10a is stored in the ring buffer 12.

Although not shown in FIG. 2, the clock calibration module 8 continues to trigger and stop counters until all four counters 10a-d have recorded the number of HF clock cycles taken for two LF clock cycles to elapse. At this point the buffer 12 contains four measurements of the number of HF clock cycles taken for two LF clock cycles to elapse.

Figure 3:
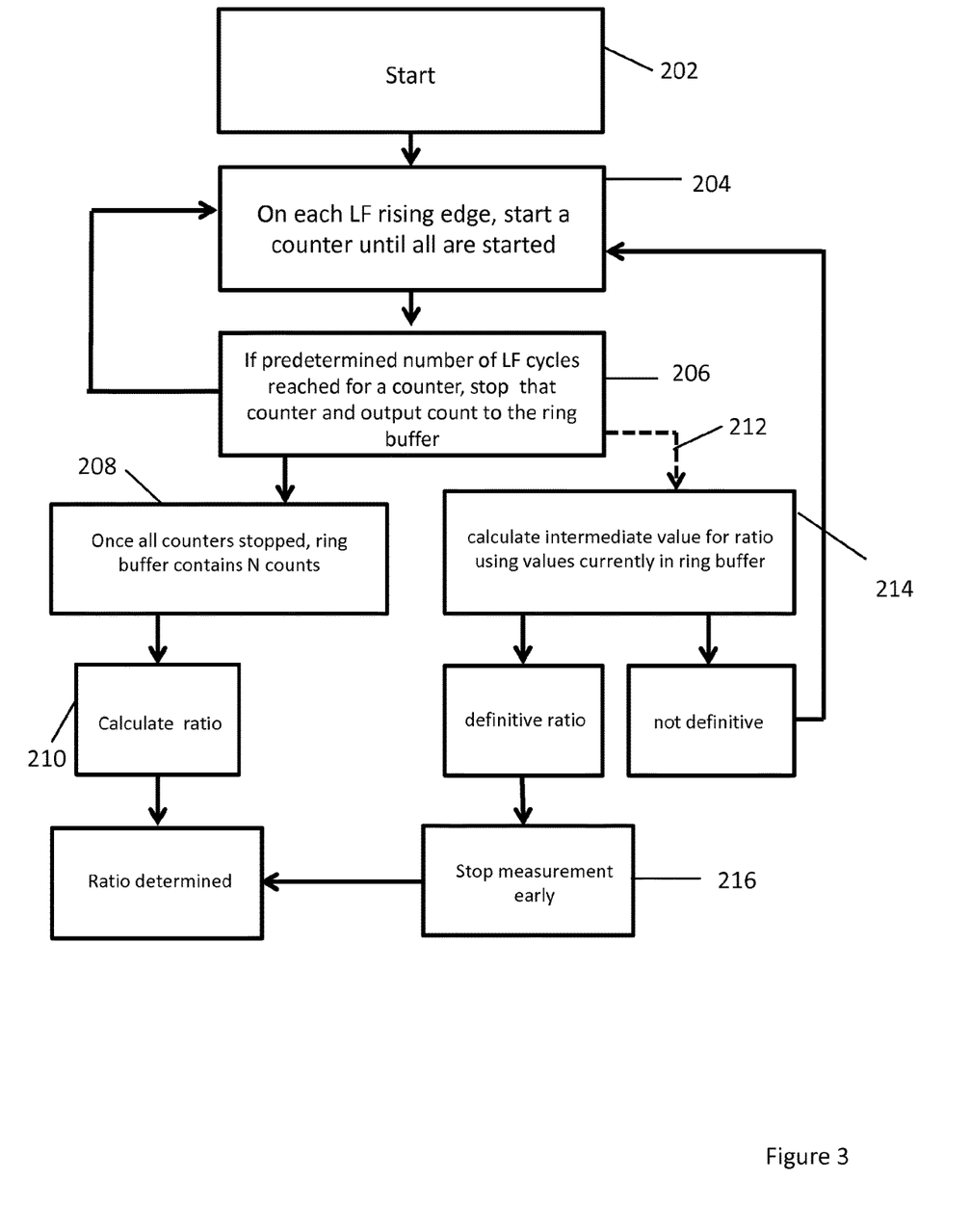
FIG. 3 is a flow diagram illustrating the operation of the clock module in FIG. 1.

This measurement process is shown in FIG. 3, whereby in step 204 a different one of the counters 10a-d is started on each rising edge of the LF clock signal 14 until all counters 10a-d are started. At step 206, the clock module 2 checks if the predetermined number of LF cycles has been reached for any of the counters 10a-d. If it has, the counter is stopped and its count is outputted to the ring buffer 12. The process then repeats steps 204 and 206 until all four counters 10a-d have been started and subsequently stopped at step 208. At step 210, the processor 9 then reads the four measurements stored in the ring buffer 12, and uses them to calculate a ratio between the lower frequency $f_1$ and the higher frequency $f_2$ by dividing the average value of the measurements in the ring buffer by the predetermined number of cycles M.

As shown by the dotted line 212, the measurement process optionally comprises steps 214 and 216. The processor 9 is able to read the contents of the ring buffer 12 at any time and as such, in addition to reading the contents of the ring buffer 12 once all four counters 10a-d have provided a measurement, the processor 9 is also able to read the ring buffer 12 when only N counters have provided a measurement, where N is less than four.

At step 214, the processor 9 calculates an intermediate value of the ratio between the lower frequency f1 and the higher frequency f2, using the average of the N measurements that are available. While this intermediate value is likely to be less accurate than one determined using measurements from all of the counters 10a-d, it may still indicate a definitive ratio. In order to establish whether the intermediate value is definitive, the processor 9 may calculate a measure of statistical dispersion (e.g. a variance) of the measurements in the ring buffer 12, and compare this to a threshold value of statistical dispersion when deciding if a determined value of the ratio is definitive.

If the intermediate value for the ratio is definitive, the processor 9 may cut short any further measurements by stopping any counters 10a-d that have not yet been stopped to prevent unnecessary further power use. If the intermediate value for the ratio is not definitive, the process returns to step 204. An intermediate value for the ratio may not be calculated on every rising edge of the LF clock signal 14.

While in this case the counters 10a-d count the number of cycles of the high frequency clock 6 taken for two low frequency clock cycles to elapse, this may be set by the processor to any number of low frequency clock cycles. Counting a greater number of low frequency cycles reduces the effects of any phase difference between the LF clock signal 14 and the HF clock signal 16 on the measured ratio, as the error caused by the initial rising edge offset is averaged across many cycles.

Figure 4:
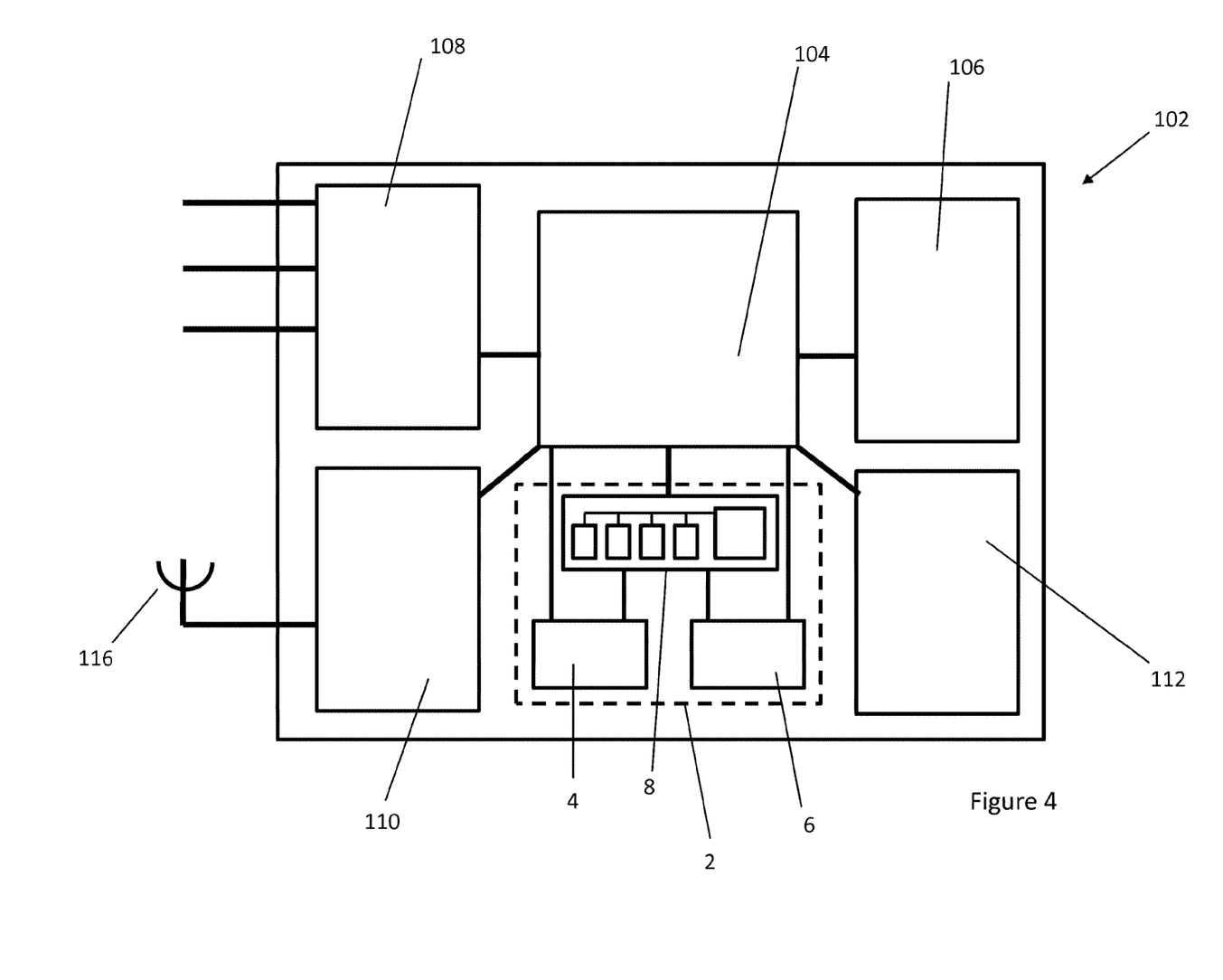
FIG. 4 shows a modem SoC according to another embodiment of the present invention.

FIG. 4 shows a modem SoC 102 that comprises a processor 104, a memory 106, an input/output module 108, a transceiver module 110, a SIM 112, and the clock module 2 described above.

The modem 102 may be provided as part of a battery powered mobile communication device (not shown), for example a smartphone or an 'Internet of Things' connected smart device. In such cases the input/output module 8 provides means for communication with other elements of the device, for example a display or a sensor (not shown). It is desirable, particularly when provided as part of a battery powered device, to decrease the power demands of the modem 102 so as to increase battery life.

The modem 102 is operable to send and receive data from a network (not shown) via an antenna 116 and the transceiver module 110. Data received by the modem 102 is decoded by the processor 104 and may be sent onto other components of the device in an understandable format via the input/output module 108.

In use, the processor 104 executes various tasks, for example controlling discontinuous reception (DRX) operation of the transceiver module 110. In such operation the processor 104 controls the transceiver module 110 to periodically receive data from the network, in short prearranged time slots, and to power down in between. DRX operation can reduce the power demands of the modem 102 significantly compared to continuous reception operation (where the transceiver module 110 is continually powered), however to achieve reliable and effective operation the processor 104 must issue control commands at precise times to synchronise the reception periods properly with the network.

As described above, the clock module 2 comprises a low frequency clock 4 (such as an RC oscillator), a high frequency clock 6 (such as a crystal oscillator) and a clock calibration module 8.

During ordinary operation, the processor 104 is fully powered and uses the high frequency clock 6 for timing. However in order to reduce the power used by the modem 102, when the processor 104 is not in use (i.e. when it is not executing a task), the processor 104 enters into a lower power sleep state where one or more modules or circuits are switched off. There can often be long periods of time between tasks being executed, and so this measure can decrease power use significantly.

The high frequency clock 6 is switched off in the lower power sleep state, and instead the low frequency clock 4 is used to keep time.

The low frequency clock 4, however, is not entirely reliable. Between and during periods of sleep, the frequency of the low frequency clock 4 may drift from its nominal value, such that times measured by the low frequency clock 4 vary. To be confident of executing a task (e.g. starting a receiver for a DRX reception time slot) at precisely the correct time, the processor 104 may, on entry to the higher power state, measure the frequency of the low power clock 4, and use this measurement to determine and compensate for any drift that has occurred during the preceding period of low power operation. This allows the processor 104 to execute the task at precisely the right time This frequency measurement is achieved by comparing the frequency of the low frequency clock 4 to that of the high frequency clock 6. Higher frequency clocks are generally less susceptible to drift and so are suitable to use as reference clocks.

The ratio of the frequencies is be determined by the processor 104 during a period of high power operation. The clock module 2 is operated as described above, such that the ring buffer 12 contains measurements of the number of the high frequency clock cycles taken for a number, predetermined by the processor 104, of low frequency clock cycles to elapse. The processor 104 reads the contents of the ring buffer 12 and uses it to determine a ratio between the frequency of the low frequency clock 4 and that of the high frequency clock 6. This ratio can be compared to a previously measured (or provided) value to identify the amount of drift that has occurred.

In order to reduce the effects of jitter and other factors (e.g. phase offset from the HF clock signal 16) impacting the LF clock signal 14 and therefore the ratio determined by the processor 104, the processor 104 may calculate an average of the entries in the ring buffer 12, and use this average to determine the ratio.

The processor 104 can in fact read the contents of the ring buffer 12 at any time, including during a calibration. The processor 104 can therefore quickly produce a first estimate of the ratio using only a count from the first counter 10a or the first few counters (e.g. using counts from the first and second counters 10a, 10b). If the first estimate of the ratio definitively shows no drift has occurred since the previous calibration, the processor 104 may cut the calibration short, instructing the clock calibration module 8 to stop all the counters 10a-d. By reducing the length of time taken for a calibration, the total amount of time the processor 104 must spend in the higher power state may be reduced.

Once the processor 104 has determined the current ratio between the frequencies of the low and high frequency clocks 4, 6, it can adjust timings made by the low frequency clock 4 to ensure that the task is executed at the correct time.

This process of calibrating the low frequency clock 4 may be carried out during every period of high power operation. However if the processor 104 determines from a calibration that no or negligible drift has occurred since a previous calibration, it may not perform a calibration following the subsequent period of low power operation, saving power by reducing the amount of time the processor 104 is in the higher power state.

Figure 5:
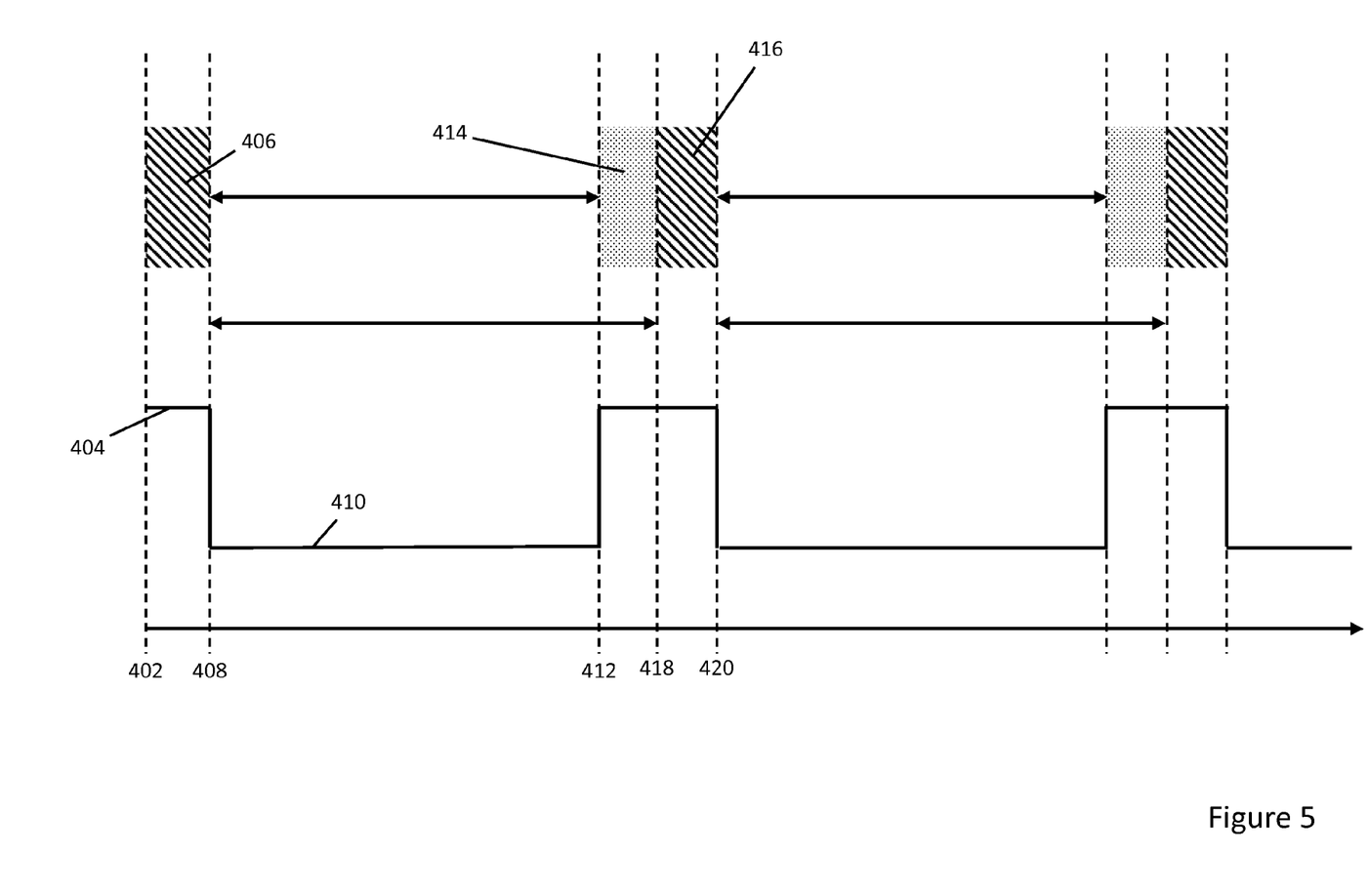
FIG. 5 is a timing diagram illustrating an example of operation of the modem SoC shown in FIG. 4.

FIG. 5 is a timing diagram illustrating operation of the modem SoC described above. At a first time 402 the modem 102 is in a high power state 404 and initiates a DRX reception period 406 which lasts until a second time 408. The modem 102 then enters a low power state 410 during which the processor 104 enters sleep, the high frequency clock 6 is not powered and the low frequency clock 4 is used to keep time. At a later time 412, the modem 102 re-enters the high power state 404. The processor then carries out a calibration 414 of the low frequency clock 4 as described above, determining a ratio between the frequencies of the low frequency clock 4 and the high frequency clock 6 and using this ratio to calculate a true time elapsed since the modem 102 entered the lower power state 410. The modem 102 is then able to execute a second DRX reception period 416 at precisely the right time 418.

At a subsequent time 420, after the DRX reception period 416 has ended, the modem enters the low power state 410. This process is repeated as operation of the modem 102 continues.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A circuit system comprising:
a processor;
a first clock with a first frequency;
a second clock with a second frequency, such second frequency being higher than said first frequency; and
a clock calibration module comprising a plurality of counters configured to count cycles of the second clock when triggered; wherein
each of the plurality of counters is configured to be triggered at successive cycles of the first clock;
each of the plurality of counters is configured, after a predetermined number of cycles of the first clock, to output a count of elapsed second clock cycles;
the processor is configured to determine, using the counts outputted by the plurality of counters, a ratio between the first frequency and the second frequency, and to use the ratio to perform a calibration of the pre-set number of cycles used by the first clock;
wherein the processor is further configured:
to determine a value of the ratio between the first frequency and the second frequency using measurements from only a sub-set of the plurality of counters;
to determine if an uncertainty parameter of the value is below a threshold and, if the uncertainty parameter is below the threshold, to cut short a calibration of the pre-set number of cycles used by the first clock.

2. The circuit system as claimed in claim 1, wherein at least some counters of the plurality of counters are arranged to count in parallel.

3. The circuit system as claimed in claim 1, wherein the first clock is configured to issue a signal to the processor once a pre-set number of cycles have elapsed.

4. The circuit system as claimed in claim 1, wherein the processor is operable in a lower power state and a higher power state and the processor is configured to perform a calibration of the first clock every time it enters the higher power state.

5. The circuit system as claimed in claim 1, wherein the processor is configured to decide dynamically whether or not to perform a calibration based upon a previously determined ratio.

6. The circuit system as claimed in claim 1, wherein the second clock is powered down when the calibration is complete.

7. The circuit system as claimed in claim 1, wherein the circuit system is configured to extend a calibration if required.

8. The circuit system as claimed in claim 1, wherein the plurality of counters comprises a plurality of hardware counters.

9. The circuit system as claimed in claim 1, wherein the processor is configured to determine an initial value for the ratio using the count outputted by a first counter of the plurality of counters.

10. The circuit system as claimed in claim 1, wherein the plurality of counters comprises at least five counters.

11. The circuit system as claimed in claim 1, wherein the clock calibration module further comprises a ring buffer, to which the counts outputted by the plurality of counters are saved.

12. The circuit system as claimed in claim 1, wherein the processor is configured to provide one or more measurement parameters to the clock calibration module and to vary dynamically the measurement parameters provided to the clock calibration module dependent upon a previously determined ratio.

13. The circuit system as claimed in claim 1, wherein the processor is configured to use the ratio to refine a previous time measurement.

14. The circuit system as claimed in claim 1, wherein the processor is configured to predict a maximum level of drift expected during a period of low power operation.

15. The circuit system as claimed in claim 14, wherein the maximum level of expected drift is adjusted dynamically based upon a previously measured ratio.

16. The circuit system as claimed in claim 1, wherein the first frequency is less than 100 kHz.

17. The circuit system as claimed in claim 1, wherein the second frequency is greater than 1 MHz.

* * * * *